(12) United States Patent
Zhang et al.

(10) Patent No.: US 12,068,930 B2
(45) Date of Patent: Aug. 20, 2024

(54) METHOD AND APPARATUS FOR DETERMINING APPLICATION SERVICE DEPENDENCY AND PROCESSOR

(71) Applicant: Hillstone Networks Co., Ltd., Jiangsu (CN)

(72) Inventors: Ye Zhang, Jiangsu (CN); Linyang Shu, Jiangsu (CN); Yuxuan Jiang, Jiangsu (CN); Dongyi Jiang, Jiangsu (CN)

(73) Assignee: Hillstone Networks Co., Ltd., Jiangsu (CN)

( * ) Notice: Subject to any disclaimer, the term of this patent is extended or adjusted under 35 U.S.C. 154(b) by 0 days.

(21) Appl. No.: 17/279,603

(22) PCT Filed: Dec. 31, 2020

(86) PCT No.: PCT/CN2020/141923
§ 371 (c)(1),
(2) Date: Mar. 25, 2021

(87) PCT Pub. No.: WO2022/141340
PCT Pub. Date: Jul. 7, 2022

(65) Prior Publication Data
US 2023/0336444 A1    Oct. 19, 2023

(51) Int. Cl.
*H04L 43/062* (2022.01)
*G06F 9/455* (2018.01)
*H04L 43/045* (2022.01)

(52) U.S. Cl.
CPC ........ *H04L 43/045* (2013.01); *G06F 9/45558* (2013.01); *G06F 2009/45595* (2013.01)

(58) Field of Classification Search
CPC ..... H04L 43/045; H04L 43/062; H04L 43/20; G06F 11/0709; G06F 11/0757
(Continued)

(56) References Cited

U.S. PATENT DOCUMENTS 7,822,837 B1 * 10/2010 Urban ................... H04L 43/00
                                                     709/223
8,990,817 B1    3/2015 Garai et al.
(Continued)

FOREIGN PATENT DOCUMENTS

CN    105991367 A    10/2016
CN    107766060 A    3/2018
(Continued)

OTHER PUBLICATIONS

International Search Report for corresponding application PCT/CN2020/141923 filed Dec. 31, 2020; Mail date Sep. 15, 2021.

*Primary Examiner* — Meng Vang
(74) *Attorney, Agent, or Firm* — Samson G. Yu

(57) ABSTRACT

The present disclosure provides a method and apparatus for determining an application service dependency, and a processor. The method includes that: an input pulse of first application service and an output pulse of second application service are acquired; a time interval between the input pulse and the output pulse is determined; and an application service dependency between the first application service and the second application service is determined based on the time interval. According to the present disclosure, a technical problem that an application service dependency between different pieces of application service cannot be determined accurately through a method for determining an application service dependency provided in the related art is solved.

15 Claims, 3 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 2009/0204696 | A1* | 8/2009 | Zhang | H04L 67/62 |
| | | | | 709/223 |
| 2014/0282189 | A1* | 9/2014 | Bansal | G06F 8/35 |
| | | | | 715/771 |
| 2017/0250880 | A1* | 8/2017 | Akens | H04L 41/5067 |
| 2019/0207837 | A1* | 7/2019 | Malhotra | H04L 41/0896 |

FOREIGN PATENT DOCUMENTS

| | | |
|---|---|---|
| CN | 109672662 A | 4/2019 |
| CN | 111831706 A | 10/2020 |

* cited by examiner

METHOD AND APPARATUS FOR DETERMINING APPLICATION SERVICE DEPENDENCY AND PROCESSOR

TECHNICAL FIELD

The present disclosure relates to the technical field of computers, and in particular to a method and apparatus for determining an application service dependency, and a processor.

BACKGROUND

With business development of enterprises, the amount of corresponding application service has kept increasing and dependencies between different pieces of application service have become more complex. An application service dependency is obviously important, and it is complex to discover the application service dependency. Some service dependency discovering methods are provided in related art. For example, the application service dependency is found by methods for application service scanning, service host agent, network traffic monitoring and the like.

Taking the method for the network traffic monitoring as an example, known application service dependency knowledge is required to be utilized. In a virtual data center, application service runs in a virtual machine, the virtual machine is deployed to be started or stopped manually by a user or automatically through a management system, and a piece of service may be provided by multiple virtual machines and run in a physical machine. That is, a data center administrator cannot accurately determine a dependency between different pieces of application service, find a failure point of certain application service and rapidly solve a problem to recover the application service in such a highly flexible deployment environment by use of the known knowledge.

Moreover, it is also necessary to analyze a load response of application service. However, there is so much network application service. Therefore, the corresponding load analysis cost is quite high, and changing requirements of application protocols cannot be met. For example, an old application protocol, an application protocol upgrade, a private application protocol and the like may make an analysis result indeterminate.

For the problems, no effective solution has been provided yet.

SUMMARY

At least some embodiments of the present disclosure provide a method and apparatus for determining an application service dependency, and a processor, so as at least to partially solve a technical problem that an application service dependency between different pieces of application service cannot be determined accurately through a method for determining an application service dependency provided in the related art.

In an embodiment of the present disclosure, a method for determining an application service dependency is provided, which includes that: an input pulse of first application service and an output pulse of second application service are acquired; a time interval between the input pulse and the output pulse is determined; and an application service dependency between the first application service and the second application service is determined based on the time interval.

Optionally, the operation that the input pulse of the first application service and the output pulse of the second application service are acquired includes that: upon the detection of traffic of the first application service entering a host, the traffic flowing through an input port corresponding to the first application service is acquired to obtain the input pulse; and upon the detection of traffic of the second application service sent from the host, the traffic flowing through an output port corresponding to the second application service is acquired to obtain the output pulse.

Optionally, the operation that the application service dependency between the first application service and the second application service is determined based on the time interval includes that: it is determined whether the time interval is less than or equal to a predetermined time interval or not to obtain a determination result; it is determined whether a pulse fitting relationship exists between the input pulse and the output pulse or not according to the determination result; and the application service dependency between the first application service and the second application service is determined based on whether the pulse fitting relationship exists or not.

Optionally, the operation that it is determined whether the pulse fitting relationship exists between the input pulse and the output pulse or not according to the determination result includes that: when the determination result indicates that the time interval is less than or equal to the predetermined time interval, it is determined that the pulse fitting relationship exists between the input pulse and the output pulse; and when the determination result indicates that the time interval is greater than the predetermined time interval, it is determined that the pulse fitting relationship does not exist between the input pulse and the output pulse.

Optionally, the operation that the application service dependency between the first application service and the second application service is determined based on whether the pulse fitting relationship exists or not includes that: when the pulse fitting relationship exists between the input pulse and the output pulse, it is determined that the first application service depends on the second application service; and when the pulse fitting relationship does not exist between the input pulse and the output pulse, it is determined that the first application service does not depend on the second application service.

Optionally, the operation that it is determined that the first application service depends on the second application service when the pulse fitting relationship exists between the input pulse and the output pulse includes that: it is periodically detected whether the pulse fitting relationship exists persistently between the input pulse and the output pulse or not; and when a detection result is YES, it is determined that the first application service depends on the second application service.

Optionally, after the operation that the application service dependency between the first application service and the second application service is determined based on the time interval, the method further includes that: multiple application service dependencies between multiple pieces of first application service and multiple pieces of second application service are acquired; a closed loop between the multiple application service dependencies is determined; and a tree application service dependency chain between the multiple pieces of first application service and the multiple pieces of second application service is obtained in a manner of removing the closed loop.

Optionally, after the operation that the tree application service dependency chain between the multiple pieces of first application service and the multiple pieces of second application service is obtained, the method further includes that: an application service dependency graph is drawn based on the tree application service dependency chain; and the application service dependency graph is displayed.

In another embodiment of the present disclosure, an apparatus for determining an application service dependency is also provided, which includes: an acquisition component, configured to acquire an input pulse of first application service and an output pulse of second application service; an analysis component, configured to determine a time interval between the input pulse and the output pulse; and a determination component, configured to determine an application service dependency between the first application service and the second application service based on the time interval.

In another embodiment of the present disclosure, a non-transitory storage medium is also provided, which stores multiple instructions. The multiple instructions are suitable for a processor to load to execute any abovementioned method for determining an application service dependency.

In another embodiment of the present disclosure, a processor is also provided, which is configured to run a program. The program is configured to run to execute any abovementioned method for determining an application service dependency.

In another embodiment of the present disclosure, an electronic device is also provided, which includes a memory and a processor. A computer program is stored in the memory. The processor is configured to run the computer program to execute any abovementioned method for determining an application service dependency.

Through the at least some embodiments of the present disclosure, the input pulse of the first application service and the output pulse of the second application service are acquired, the time interval between the input pulse and the output pulse is determined, and the application service dependency between the first application service and the second application service is determined based on the time interval. In such a manner, the purpose of determining the dependency between the application service is achieved, so that the technical effect of rapidly solving a problem and recovering application service when any one or more pieces of application service fail is achieved, and the technical problem that the application service dependency between different pieces of application service cannot be determined accurately through the method for determining the application service dependency provided in the related art is further solved.

BRIEF DESCRIPTION OF THE DRAWINGS

The drawings described here are adopted to provide a further understanding to the present disclosure and form a part of the application. Schematic embodiments of the present disclosure and descriptions thereof are adopted to explain the present disclosure and not intended to form improper limits to the present disclosure. In the drawings.

DETAILED DESCRIPTION

In order to make those skilled in the art understand the solutions of the present disclosure better, the technical solutions in the embodiments of the present disclosure will be clearly and completely described below in combination with the drawings in the embodiments of the present disclosure. It is apparent that the described embodiments are not all embodiments but a part of the embodiments of the present disclosure. All other embodiments obtained by those of ordinary skill in the art based on the embodiments in the present disclosure without creative work shall fall within the scope of protection of the present disclosure.

It is to be noted that the terms like "first" and "second" in the specification, claims and accompanying drawings of the present disclosure are used for differentiating the similar objects, but do not have to describe a specific order or a sequence. It is to be understood that data used like this may be exchanged under a proper condition for implementation of the embodiments of the present disclosure described here in sequences besides those shown or described herein. In addition, terms "include" and "have" and any transformation thereof are intended to cover nonexclusive inclusions. For example, a process, method, system, product or device including a series of steps or elements is not limited to those clearly listed steps or elements, but may include other steps or elements which are not clearly listed or inherent in the process, the method, the system, the product or the device.

Embodiment One

In an embodiment of the present disclosure, a method for determining an application service dependency is provided. It is to be noted that the steps presented in the flowchart of the drawings can be executed in a computer system like a set of computer executable instructions and, moreover, although a logical sequence is shown in the flowchart, in some cases, the presented or described steps can be executed in a sequence different from that described here.

Figure 1:
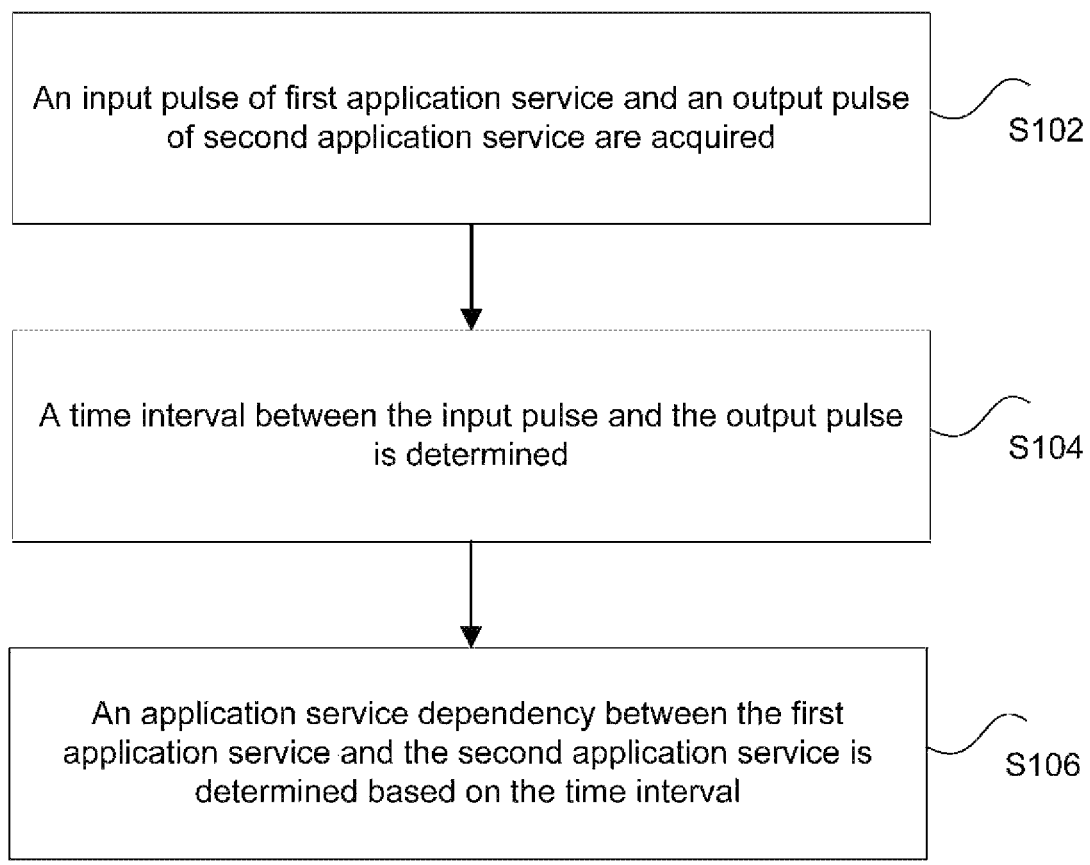
FIG. 1 is a flowchart of a method for determining an application service dependency according to an embodiment of the present disclosure.

FIG. 1 is a flowchart of a method for determining an application service dependency according to an embodiment of the present disclosure. As shown in FIG. 1, the method includes the following steps.

In step S102, an input pulse of first application service and an output pulse of second application service are acquired.

In step S104, a time interval between the input pulse and the output pulse is determined.

In step S106, an application service dependency between the first application service and the second application service is determined based on the time interval.

In the embodiment of the present disclosure, the input pulse of the first application service and the output pulse of the second application service are acquired, the time interval between the input pulse and the output pulse is determined, and the application service dependency between the first application service and the second application service is determined based on the time interval. In such a manner, the purpose of determining the dependency between the application service is achieved, so that the technical effect of rapidly solving a problem and recovering application service when any one or more pieces of application service fail is achieved, and the technical problem that the application service dependency between different pieces of application service cannot be determined accurately through the method for determining the application service dependency provided in the related art is further solved.

Optionally, the application service refers to some connection-oriented distributed-program-based software components running in a network host. A general Internet standard such as Hyper Text Transfer Protocol (HTTP) and Extensive Markup Language (XML) (a subset of a standard generalized markup language) is usually adopted for the application service such that users may access data in the host, for example, booking tickets online and checking ticket booking conditions, in different places through different terminal devices. Application service is applied extensively to the application fields of electronic commerce, electronic government, company business process electronization and the like.

Optionally, an application service dependency refers to a dependency between different pieces of application service in a network service system. For example, one piece of application service is required to depend on which service provided by another application service, or which service of one piece of application service is required to be provided for another application service, so as to form a complex application service dependency graph of a mesh structure.

It is to be noted that, in the technical field, an application dependency graph is quite important to Information Technology (IT) operation, maintenance and management personnel and of great help to stabilization of application service, performance of the application service, upgrade evaluation of the application service, failure diagnosis of the application service and the like.

The method for determining the application service dependency provided in the embodiment of the application may be applied to enterprise and data center networks to implement a logically simple and implementable data-analysis-based dynamic application service dependency discovering method and solve the problems that the related art cannot be adapted to IT environment changes and there is so much application service. The core is to dynamically determine an application service dependency in a present network by full use of a stress response model of application service dependencies through a pulse fitting algorithm.

The embodiment of the application is applied to a network device (including, but not limited to, a network traffic security device, a network data forwarding device, a network traffic analysis device and a network traffic management device, for example, a FireWall (FW)/Next Generation FireWall (NGFW), an Intrusion Detection System (IDS)/Intrusion Prevention System (IPS), a Web Application Firewall (WAF), an Application Delivery Controller (ADC), Big Data Security (BDS) and a Router), and is also applied to a virtual network function or a virtual network device (including, but not limited to, a virtual network traffic security function or device, a virtual network data forwarding function or device, a virtual network traffic analysis function or device and a virtual network traffic management function or device, for example, a vFW/vNGFW, a vIDS/vIPS, a vWAF, a vADC, a vBDS and a vRouter).

The method for determining the application service dependency provided in the embodiment of the application is mainly adopted to solve the problem of how to automatically recognize service provided by a host in a network and dependencies between the network application service by use of traffic in the network, thereby making it convenient for a network administrator to timely know application service in the network and application service dependencies between multiple pieces of network application service.

Figure 2:
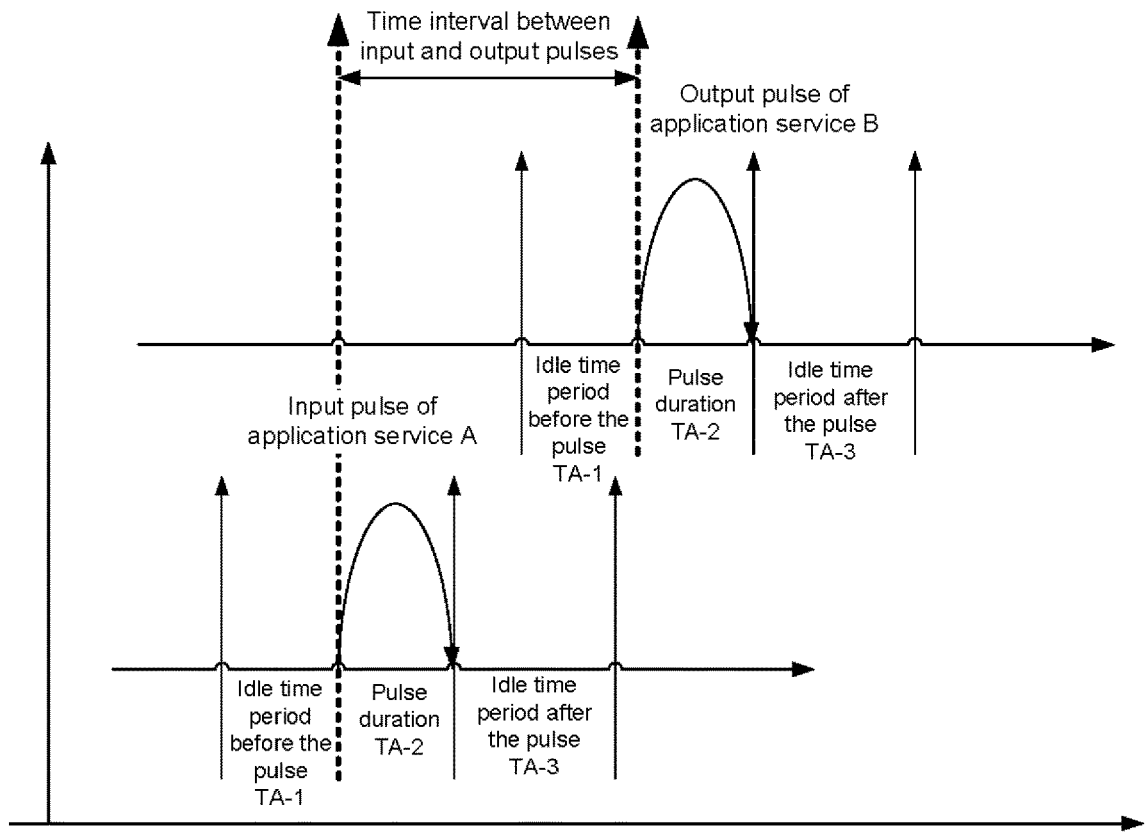
FIG. 2 is a schematic diagram of application service dependency pulse fitting according to an optional embodiment of the present disclosure.

FIG. 2 shows an optional schematic diagram of application service dependency pulse fitting. When application service A (namely the first application service) in a certain host depends on application service B (namely the second application service), corresponding to each network business processing of the host at this endpoint, the host at this endpoint may receive a request of the application service A and initiate an associated request of the application service B to a host of the application service that the application service A depends on. And a dependency that the application service A in the host at this endpoint depends on the application service B may be determined according to a stress response model.

It is to be noted that the application service B is usually deployed in another host, namely the application service A and the application service B are deployed in different hosts. Or, the application service A and the application service B may also be deployed in the same host.

It is to be noted that an algorithm for the application service dependency may be implemented based on, but not limited to, the following premise in the embodiment of the application.

First, the input pulse of the application service A and the output pulse of the application service B may be recognized independently from input and output data traffic of the present host, namely the pulses may be extracted from the data traffic. A data pulse is more likely to be detected under a light traffic load condition, namely there is a certain idle time interval between the input pulse and the output pulse.

Second, the time interval between the input pulse of the application service A and the output pulse of the application service B has certain regularity. Under the most ideal condition, an input pulse of each piece of application service A corresponds to an output pulse of corresponding application service B, namely the time interval between the input pulse and the output pulse is relatively short and each time interval is substantially the same. In such case, it may be deduced that a certain dependency exists between the input pulse of the application service A and the output pulse of the application service B, namely the application service A depends on the application service B.

Still as shown in FIG. 2, the time interval between the input pulse and the output pulse is subject to a time interval between rising edges of two pulses.

In an optional embodiment, the operation that the input pulse of the first application service and the output pulse of the second application service are acquired includes the following steps.

In step S202, upon the detection of traffic of the first application service entering a host, the traffic flowing through an input port corresponding to the first application service is acquired to obtain the input pulse.

In step S204, upon the detection of traffic of the second application service sent from the host, the traffic flowing through an output port corresponding to the second application service is acquired to obtain the output pulse.

Optionally, in the embodiment of the application, based on each host entity (including, but not limited to, a physical machine, a virtual machine or a container, etc.), an application service entity set in the host is dynamically analyzed and calculated according to input and output network traffic of the host. Based on input and output application service entities in each host, traffic pulse oscillograms generated according to time sequences are analyzed and calculated for the input and output application service entities according to the input and output network traffic of the host.

With respect to calculation of the input pulse and the output pulse, for the input pulse, the traffic flowing through the input port of the host corresponding to each input application service is analyzed and calculated, namely the traffic flowing through the input port corresponding to the first application service is acquired to obtain the input pulse upon the detection of the traffic of the first application service entering the host. And for the output pulse, the traffic flowing through the output port of the host corresponding to each output application service is analyzed and calculated, namely the traffic flowing through the output port corresponding to the second application service is acquired to obtain the output pulse upon the detection of the traffic of the second application service sent from the host.

It is to be noted that a pulse may be formed when idle time lengths before and after a data pulse meet a certain time interval (for example, the idle time interval≥1 s). In the embodiment of the application, there are no specific requirements made to a width of the pulse or data traffic during the pulse.

In an optional embodiment, the operation that the application service dependency between the first application service and the second application service is determined based on the time interval includes the following steps.

In step S302, it is determined whether the time interval is less than or equal to a predetermined time interval or not to obtain a determination result.

In step S304, it is determined whether a pulse fitting relationship exists between the input pulse and the output pulse or not according to the determination result.

In step S306, the application service dependency between the first application service and the second application service is determined based on whether the pulse fitting relationship exists or not.

As an optional embodiment, based on the input and output application service entities in each host, application service dependencies between the input and output application service are analyzed and calculated by use of an application service dependency pulse fitting data analysis algorithm.

In an optional embodiment, the operation that it is determined whether the pulse fitting relationship exists between the input pulse and the output pulse or not according to the determination result includes the following steps.

In step S402, when the determination result indicates that the time interval is less than or equal to the predetermined time interval, it is determined that the pulse fitting relationship exists between the input pulse and the output pulse.

In step S404, when the determination result indicates that the time interval is greater than the predetermined time interval, it is determined that the pulse fitting relationship does not exist between the input pulse and the output pulse.

For example, for an input pulse of each piece of input application service, an output pulse of each piece of output application service is searched, and when a time interval between the input pulse and the output pulse is relatively short (for example, the time interval≤10 ms), it is preliminarily deduced that an application service dependency exists between the input pulse and the output pulse.

In an optional embodiment, the operation that the application service dependency between the first application service and the second application service is determined based on whether the pulse fitting relationship exists or not includes the following steps.

In step S502, when the pulse fitting relationship exists between the input pulse and the output pulse, it is determined that the first application service depends on the second application service.

In step S504, when the pulse fitting relationship does not exist between the input pulse and the output pulse, it is determined that the first application service does not depend on the second application service.

It is to be noted that, in a practical implementation process, it is necessary to traverse all output pulses for each input pulse. A pseudo code for calculation of the application service dependency is summarized as follows: for an input pulse of each piece of input application service belonging to a host and an output pulse of each piece of output application service belonging to the host, when a time interval between the input pulse and the output pulse is less than a specified predetermined interval (for example, 10 ms), it is preliminarily deduced that a dependency exists between the input application service and the output application service.

In an optional embodiment, the operation that it is determined that the first application service depends on the second application service when the pulse fitting relationship exists between the input pulse and the output pulse includes the following steps.

In step S602, it is periodically detected whether the pulse fitting relationship exists persistently between the input pulse and the output pulse or not.

In step S604, when a detection result is YES, it is determined that the first application service depends on the second application service.

Figure 3:
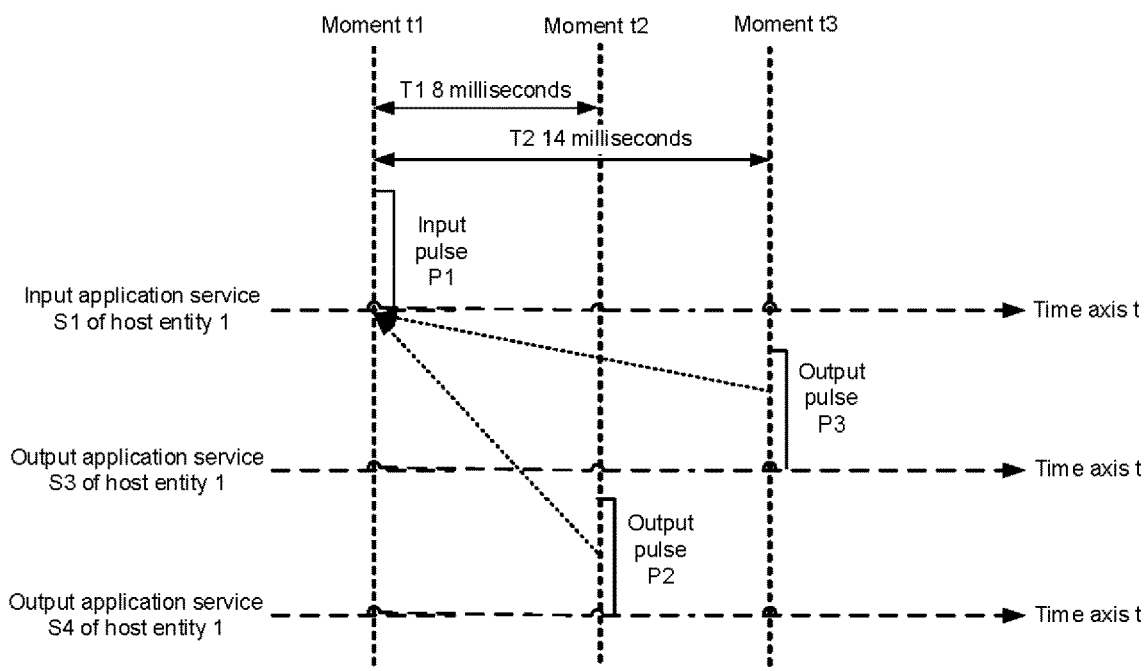
FIG. 3 is a schematic diagram of an application service dependency according to an optional embodiment of the present disclosure.

For further describing the algorithm, as shown in FIG. 3, when a dependency between input and output application service is calculated for a present host entity 1 and an interval between an input pulse and an output pulse is less than or equal to 10 ms, it is determined that the dependency exists between the input and output application service. It can be seen from FIG. 3 that: an interval T2 between an input pulse of input application service S1 and an output pulse of output application service S3 is 14 ms, so that an application service dependency does not exist between the input application service S1 and the output application service S3. And an interval T1 between the input pulse of the input application service S1 and an output pulse of output application service S4 is 8 ms, so that an application service dependency exists between the input application service S1 and the output application service S4.

In the embodiment of the application, application service dependencies between input and output application service entities of each host may also be calculated periodically (for example, calculated at an interval of 8s), an application service dependency calculation result is analyzed, and when it is determined that an application service dependency, i.e., the pulse fitting relationship, is kept for many times between a pulse of a certain piece of input application service and a pulse of a certain piece of output application service, it is deduced that the application service dependency exists between the input application service A and the output application service B.

In an optional embodiment, after the operation that the application service dependency between the first application service and the second application service is determined based on the time interval, the method further includes the following steps.

In step S702, multiple application service dependencies between multiple pieces of first application service and multiple pieces of second application service are acquired.

In step S704, a closed loop between the multiple application service dependencies is determined.

In step S706, a tree application service dependency chain between the multiple pieces of first application service and the multiple pieces of second application service is obtained in a manner of removing the closed loop.

In the embodiment of the application, the closed loop between the multiple application service dependencies is removed by use of a reasonable algorithm according to the calculated multiple application service dependencies between the multiple pieces of input application service and the multiple pieces of output application service of each host, and then a complete tree hierarchical application service dependency chain of a certain piece of initiating input application service may be obtained.

In an optional embodiment, after the operation that the tree application service dependency chain between the multiple pieces of first application service and the multiple pieces of second application service is obtained, the method further includes the following steps.

In step S802, an application service dependency graph is drawn based on the tree application service dependency chain.

In step S804, the application service dependency graph is displayed.

Figure 4:
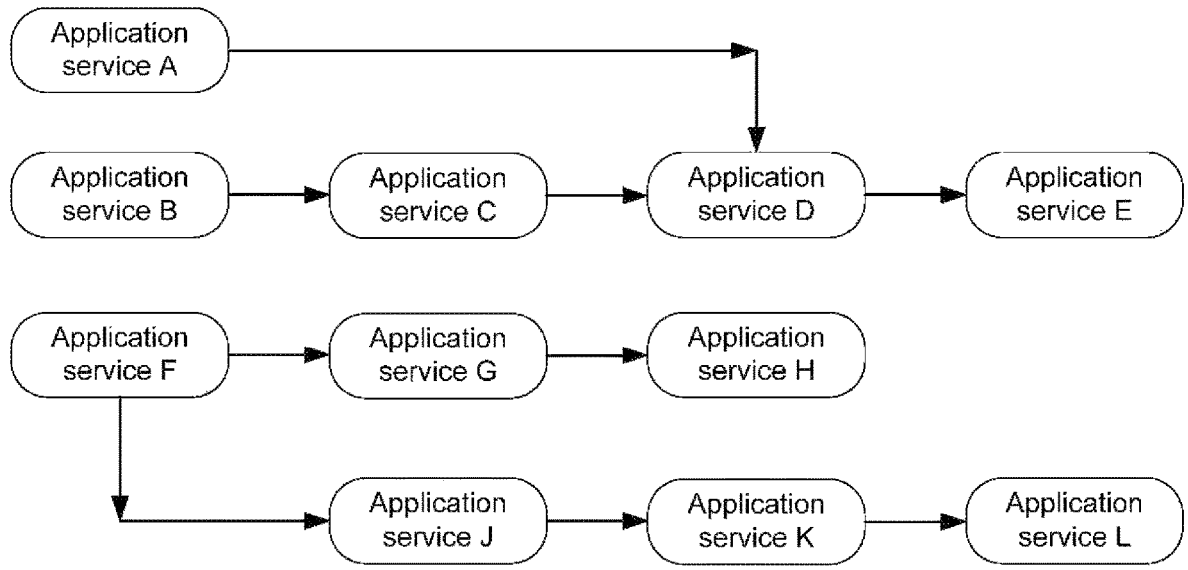
FIG. 4 is a schematic diagram of an application service dependency graph according to an optional embodiment of the present disclosure.

After the tree application service dependency chain is obtained and the application service dependency graph is drawn, the application service dependency graph may be displayed. Furthermore, the application service dependency graph obtained by dynamic machine learning may be completely displayed in the embodiment of the application, as shown in FIG. 4.

The whole solution to machine learning of application service dependencies in enterprise and data center network systems is described above. According to the solution, a data analysis method for application service dependencies is implemented by full use of an interaction mode of network traffic and a stress response model of application service traffic, and a high-cost-performance solution to determination of application service dependencies is provided for a user.

The method for determining the application service dependency provided in the embodiment of the application is relatively wide in application range, and is applied to various application service platforms such as a naked machine, a virtual platform and a container platform and hybrid application scenarios thereof, an inline or bypass mode may be adopted, and a private protocol is supported. The extensibility is high: by data analysis, relatively few Central Processing Unit (CPU) and memory resources are consumed, and the application service dependency may be learned rapidly. In addition, the numbers of hosts and application service are not limited, and a data-analysis-based pulse fitting application service dependency algorithm is adopted. Moreover, applications to various network devices, network functions and network platforms are implemented by use of the above design algorithm.

In addition, message parsing is not performed on a specific application service protocol, so that the technical solution of the present disclosure has obvious advantages in extensibility and performance.

Embodiment Two

Figure 5:
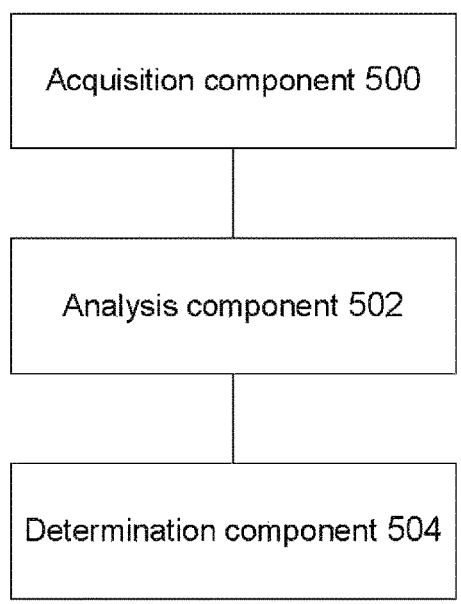
FIG. 5 is a structural schematic diagram of an apparatus for determining an application service dependency according to an embodiment of the present disclosure.

In an embodiment of the present disclosure, an apparatus for determining an application service dependency is also provided. FIG. 5 is a structure schematic diagram of an apparatus for determining an application service dependency according to an embodiment of the present disclosure. As shown in FIG. 5, the apparatus for determining the application service dependency includes an acquisition component 500, an analysis component 502 and a determination component 504.

The acquisition component 500 is configured to acquire an input pulse of first application service and an output pulse of second application service. The analysis component 502 is configured to determine a time interval between the input pulse and the output pulse. The determination component 504 is configured to determine an application service dependency between the first application service and the second application service based on the time interval.

It is to be noted that each component may be implemented through software or hardware. For example, under the latter condition, may be implemented in the following manner: each component may be positioned in the same processor, or the components are positioned in different processors in any combination form.

It is to be noted here that the acquisition component 500, the analysis component 502 and the determination component 504 correspondingly implement S102 to S106 in embodiment one, and the components implement an example and application scenario the same as those implemented by the corresponding steps but are not limited to the contents disclosed in embodiment one. It is to be noted that the component may run in a computer terminal as a part of the apparatus.

It is to be noted that optional or preferred implementation modes of the embodiment may refer to the related descriptions in embodiment one and will not be elaborated herein.

The apparatus for determining the application service dependency may further include a processor and a memory. The acquisition component 500, the analysis component 502 and the determination component 504 are stored in the memory as program elements, and the processor executes the program elements stored in the memory to realize corresponding functions.

The processor includes a core, and the core calls the corresponding program element in the memory. At least one core may be arranged. The memory may include forms such as a non-transitory memory, Random Access Memory (RAM) and/or non-transitory memory in a computer-readable medium, for example, a Read-Only Memory (ROM) or a flash RAM, and the memory includes at least one storage chip.

In an embodiment of the application, a non-transitory storage medium is also provided. Optionally, in the embodiment, the non-transitory storage medium includes a stored program. The program runs to control a device where the non-transitory storage medium is to execute any abovementioned method for determining the application service dependency.

Optionally, in the embodiment, the non-transitory storage medium may be in any computer terminal in a computer terminal group in a computer network or any mobile terminal in a mobile terminal group. The non-transitory storage medium includes the stored program.

Optionally, the program runs to control the device where the non-transitory storage medium is to execute the following functions of: acquiring an input pulse of first application service and an output pulse of second application service; determining a time interval between the input pulse and the output pulse; and determining an application service dependency between the first application service and the second application service based on the time interval.

Optionally, the program runs to control the device where the non-transitory storage medium is to execute the following functions of: upon the detection of traffic of the first application service entering a host, acquiring the traffic flowing through an input port corresponding to the first application service to obtain the input pulse; and upon the detection of traffic of the second application service sent from the host, acquiring the traffic flowing through an output port corresponding to the second application service to obtain the output pulse.

Optionally, the program runs to control the device where the non-transitory storage medium is to execute the following functions of: determining whether the time interval is less than or equal to a predetermined time interval or not to obtain a determination result; determining whether a pulse fitting relationship exists between the input pulse and the output pulse or not according to the determination result; and determining the application service dependency between the first application service and the second application service based on whether the pulse fitting relationship exists or not.

Optionally, the program runs to control the device where the non-transitory storage medium is to execute the following functions of: when the determination result indicates that the time interval is less than or equal to the predetermined time interval, determining that the pulse fitting relationship exists between the input pulse and the output pulse; and when the determination result indicates that the time interval is greater than the predetermined time interval, determining that the pulse fitting relationship does not exist between the input pulse and the output pulse.

Optionally, the program runs to control the device where the non-transitory storage medium is to execute the following functions of: when the pulse fitting relationship exists between the input pulse and the output pulse, determining that the first application service depends on the second application service; and when the pulse fitting relationship does not exist between the input pulse and the output pulse, determining that the first application service does not depend on the second application service.

Optionally, the program runs to control the device where the non-transitory storage medium is to execute the following functions of: periodically detecting whether the pulse fitting relationship exists persistently between the input pulse and the output pulse or not; and when a detection result is YES, determining that the first application service depends on the second application service.

Optionally, the program runs to control the device where the non-transitory storage medium is to execute the following functions of: acquiring multiple application service dependencies between multiple pieces of first application service and multiple pieces of second application service; determining a closed loop between the multiple application service dependencies; and obtaining a tree application service dependency chain between the multiple pieces of first application service and the multiple pieces of second application service through a manner of removing the closed loop.

Optionally, the program runs to control the device where the non-transitory storage medium is to execute the following functions of: drawing an application service dependency graph based on the tree application service dependency chain; and displaying the application service dependency graph.

In an embodiment of the application, a processor is also provided. Optionally, in the embodiment, the processor is configured to run a program. The program runs to execute any abovementioned method for determining the application service dependency.

In an embodiment of the application, an electronic device is also provided, which includes a memory and a processor. A computer program is stored in the memory. The processor is configured to run the computer program to execute any abovementioned method for determining the application service dependency.

In an embodiment of the application, a computer program product is also provided, which, when being executed in a data processing device, is suitable to execute a program initialized with the steps of any abovementioned method for determining the application service dependency.

The sequence numbers of the embodiments of the present disclosure are adopted for description and do not represent superiority-inferiority of the embodiments.

In the embodiments of the present disclosure, the descriptions of the embodiments focus on different aspects. The part which is not described in a certain embodiment in detail may refer to the related description of the other embodiments.

In some embodiments provided in the application, it should be understood that the disclosed technical contents may be implemented in other manners. Herein, the device embodiment described above is schematic. For example, division of the elements is division of logical functions, and other division manners may be adopted during practical implementation. For example, multiple elements or components may be combined or integrated to another system, or some features may be ignored or are not executed. In addition, shown or discussed coupling, direct coupling or communication connection may be implemented through indirect coupling or communication connection of some interfaces, elements or components, and may be in an electrical form or other forms.

The elements described as separate parts may or may not be separate physically, and parts displayed as elements may or may not be physical elements, that is, they may be located in the same place, or may also be distributed to multiple elements. Part or all of the elements may be selected to achieve the purpose of the solutions of the embodiments according to a practical requirement.

In addition, each functional element in each embodiment of the present disclosure may be integrated into a processing element, each element may also physically exist independently, and two or more than two elements may also be integrated into an element. The integrated element may be implemented in a hardware form and may also be implemented in form of software functional element.

When being implemented in form of software functional element and sold or used as an independent product, the integrated element may be stored in a computer-readable non-transitory storage medium. Based on such an understanding, the technical solutions of the present disclosure substantially or parts making contributions to the related art or all or part of the technical solutions may be embodied in form of software product. The computer software product is stored in a non-transitory storage medium, including a plurality of instructions configured to enable a computer device (which may be a PC, a server, a network device or the like) to execute all or part of the steps of the method in each embodiment of the present disclosure. The non-transitory storage medium includes various media capable of storing program codes such as a U disk, a ROM, a RAM, a mobile hard disk, a magnetic disk or an optical disk.

The above are exemplary embodiments of the present disclosure. It is to be pointed out that those of ordinary skill in the art may also make a number of improvements and embellishments without departing from the principle of the present disclosure and these improvements and embellishments shall also fall within the scope of protection of the present disclosure.

What is claimed is:

1. A method for determining an application service dependency, comprising:
   acquiring an input pulse of first application service and an output pulse of second application service;
   determining a time interval between the input pulse and the output pulse; and
   determining an application service dependency between the first application service and the second application service based on the time interval;
   after determining the application service dependency between the first application service and the second application service based on the time interval, further comprising:
   acquiring a plurality of application service dependencies between a plurality of pieces of first application service and a plurality of pieces of second application service;
   determining a closed loop between the plurality of application service dependencies; and
   obtaining a tree application service dependency chain between the plurality of pieces of first application service and the plurality of pieces of second application service through a manner of removing the closed loop.

2. The method as claimed in claim 1, wherein acquiring the input pulse of the first application service and the output pulse of the second application service comprises:
   upon the detection of traffic of the first application service entering a host, acquiring the traffic flowing through an input port of the host corresponding to the first application service to obtain the input pulse; and
   upon the detection of traffic of the second application service sent from the host, acquiring the traffic flowing through an output port of the host corresponding to the second application service to obtain the output pulse.

3. The method as claimed in claim 1, wherein determining the application service dependency between the first application service and the second application service based on the time interval comprises:
   determining whether the time interval is less than or equal to a predetermined time interval or not to obtain a determination result;
   determining whether a pulse fitting relationship exists between the input pulse and the output pulse or not according to the determination result; and
   determining the application service dependency between the first application service and the second application service based on whether the pulse fitting relationship exists or not.

4. The method as claimed in claim 3, wherein determining whether the pulse fitting relationship exists between the input pulse and the output pulse or not according to the determination result comprises:
   when the determination result indicates that the time interval is less than or equal to the predetermined time interval, determining that the pulse fitting relationship exists between the input pulse and the output pulse; and
   when the determination result indicates that the time interval is greater than the predetermined time interval, determining that the pulse fitting relationship does not exist between the input pulse and the output pulse.

5. The method as claimed in claim 4, wherein determining the application service dependency between the first application service and the second application service based on whether the pulse fitting relationship exists or not comprises:
   when the pulse fitting relationship exists between the input pulse and the output pulse, determining that the first application service depends on the second application service; and
   when the pulse fitting relationship does not exist between the input pulse and the output pulse, determining that the first application service does not depend on the second application service.

6. The method as claimed in claim 5, wherein determining that the first application service depends on the second application service when the pulse fitting relationship exists between the input pulse and the output pulse comprises:
   periodically detecting whether the pulse fitting relationship exists persistently between the input pulse and the output pulse or not; and
   when a detection result is YES, determining that the first application service depends on the second application service.

7. The method as claimed in claim 1, after obtaining the tree application service dependency chain between the plurality of pieces of first application service and the plurality of pieces of second application service based on the time interval, further comprising:
   drawing an application service dependency graph based on the tree application service dependency chain; and
   displaying the application service dependency graph.

8. The method as claimed in claim 1, wherein the time interval is a time interval between rising edges of two pulses.

9. The method as claimed in claim 1, wherein determining the application service dependency between the first application service and the second application service based on the time interval comprises:
   determining whether the time interval is less than or equal to the predetermined time interval or not to obtain a first determination result;
   determining whether the pulse fitting relationship exists between the input pulse and the output pulse or not according to the first determination result to obtain a second determination result; and
   determining whether the first application service depends on the second application service or not according to the second determination result.

10. The method as claimed in claim 9, wherein determining whether the pulse fitting relationship exists between the input pulse and the output pulse or not according to the first determination result comprises:
    when the first determination result indicates that the time interval is less than or equal to the predetermined time interval, determining that the pulse fitting relationship exists between the input pulse and the output pulse; and
    when the first determination result indicates that the time interval is greater than the predetermined time interval, determining that the pulse fitting relationship does not exist between the input pulse and the output pulse.

11. The method as claimed in claim 10, wherein determining whether the first application service depends on the second application service or not according to the second determination result comprises:
    when the second determination result indicates that the pulse fitting relationship exists between the input pulse and the output pulse, determining that the first application service depends on the second application service; and
    when the second determination result indicates that the pulse fitting relationship does not exist between the input pulse and the output pulse, determining that the first application service does not depend on the second application service.

12. The method as claimed in claim 11, further comprising:
periodically detecting whether the pulse fitting relationship exists persistently between the input pulse and the output pulse or not; and
when the pulse fitting relationship exists persistently between the input pulse and the output pulse, determining that the first application service depends on the second application service.

13. The method as claimed in claim 1, after determining the application service dependency between the first application service and the second application service based on the time interval, further comprising:
acquiring a plurality of application service dependencies between a plurality of pieces of first application service and a plurality of pieces of second application service;
determining the closed loop between the plurality of application service dependencies; and
obtaining one tree application service dependency chain of the first application service through a manner of removing the closed loop.

14. A non-transitory storage medium, storing a plurality of instructions, wherein the plurality of instructions are suitable for a processor to load to execute the following steps:
acquiring an input pulse of first application service and an output pulse of second application service;
determining a time interval between the input pulse and the output pulse; and
determining an application service dependency between the first application service and the second application service based on the time interval;
after determining the application service dependency between the first application service and the second application service based on the time interval, further comprising:
acquiring a plurality of application service dependencies between a plurality of pieces of first application service and a plurality of pieces of second application service;
determining a closed loop between the plurality of application service dependencies; and
obtaining a tree application service dependency chain between the plurality of pieces of first application service and the plurality of pieces of second application service through a manner of removing the closed loop.

15. An electronic device, comprising a memory and a processor, wherein a computer program is stored in the memory; and the processor is configured to run the computer program to execute the following steps:
acquiring an input pulse of first application service and an output pulse of second application service;
determining a time interval between the input pulse and the output pulse; and
determining an application service dependency between the first application service and the second application service based on the time interval;
after determining the application service dependency between the first application service and the second application service based on the time interval, further comprising:
acquiring a plurality of application service dependencies between a plurality of pieces of first application service and a plurality of pieces of second application service;
determining a closed loop between the plurality of application service dependencies; and
obtaining a tree application service dependency chain between the plurality of pieces of first application service and the plurality of pieces of second application service through a manner of removing the closed loop.

* * * * *